US010035381B2

(12) United States Patent
Schiavolin et al.

(10) Patent No.: US 10,035,381 B2
(45) Date of Patent: Jul. 31, 2018

(54) MOTOR VEHICLE TYRE

(75) Inventors: Andrea Schiavolin, Milan (IT); Mario Mariani, Milan (IT); Pierangelo Misani, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 1169 days.

(21) Appl. No.: 13/386,204

(22) PCT Filed: Jul. 28, 2010

(86) PCT No.: PCT/IB2010/001855
§ 371 (c)(1),
(2), (4) Date: Jan. 20, 2012

(87) PCT Pub. No.: WO2011/012979
PCT Pub. Date: Feb. 3, 2011

(65) Prior Publication Data
US 2012/0111465 A1    May 10, 2012

Related U.S. Application Data

(60) Provisional application No. 61/272,757, filed on Oct. 29, 2009.

(30) Foreign Application Priority Data

Jul. 28, 2009   (IT) .............................. RM2009A0398

(51) Int. Cl.
*B60C 11/03* (2006.01)
*B60C 11/117* (2006.01)

(52) U.S. Cl.
CPC ...... *B60C 11/0306* (2013.01); *B60C 11/0302* (2013.01); *B60C 11/033* (2013.01);
(Continued)

(58) Field of Classification Search
CPC .............. B60C 11/0302; B60C 11/033; B60C 2011/0374; B60C 11/032
See application file for complete search history.

(56) References Cited

U.S. PATENT DOCUMENTS

D587,645 S  *  3/2009 Steinbach .................... D12/535
D599,729 S  *  9/2009 Kumamoto ................ D12/535
(Continued)

FOREIGN PATENT DOCUMENTS

EP    0 906 836 A2    4/1999
EP    1 826 026 A1    8/2007
(Continued)

OTHER PUBLICATIONS

Machine translation for Japan 2007-331596 (no date).*
(Continued)

*Primary Examiner* — Steven D Maki
(74) *Attorney, Agent, or Firm* — Finnegan, Henderson, Farabow, Garrett & Dunner, L.L.P.

(57) ABSTRACT

Motor vehicle tyre adapted to be mounted on the rear wheel of a motor vehicle, includes a tread band having a tread pattern including a module which is repeated along a direction of circumferential extension of the tyre. The module has at least one first pair of first grooves inclined in opposite directions with respect to an equatorial plane of the tyre, and extending from the equatorial plane toward a respective shoulder; at least one second pair of second grooves inclined in opposite directions with respect to the equatorial plane and extending from the equatorial plane toward a respective shoulder. The first and the second grooves are staggered relative to each other in the circumferential direction in such a way as to maintain a substantially constant distance of less
(Continued)

than half the pitch, at the equatorial plane between each first or second groove and the adjacent one in the circumferential direction.

13 Claims, 2 Drawing Sheets

(52) U.S. Cl.
CPC ..... *B60C 11/032* (2013.01); *B60C 2011/0374* (2013.01); *B60C 2200/10* (2013.01)

(56) References Cited

U.S. PATENT DOCUMENTS

| | | |
|---|---|---|
| 2005/0098250 A1 | 5/2005 | Ito |
| 2006/0219342 A1* | 10/2006 | Steinbach ........... B60C 11/0302 152/209.11 |
| 2009/0308515 A1 | 12/2009 | Matsunaga |
| 2010/0126645 A1 | 5/2010 | Barboza et al. |
| 2010/0193095 A1 | 8/2010 | Nakagawa |
| 2010/0282390 A1* | 11/2010 | Mariani .............. B60C 11/0302 152/454 |

FOREIGN PATENT DOCUMENTS

| | | | |
|---|---|---|---|
| EP | 2 135 752 A1 | | 12/2009 |
| JP | 63-121505 A | * | 5/1988 |
| JP | 07-228107 A | * | 8/1995 |
| JP | 63-116907 A | * | 5/1998 |
| JP | 11-208218 A | * | 8/1999 |
| JP | 2007-331596 A | * | 12/2007 |
| WO | WO 2008/124899 A1 | | 10/2008 |
| WO | WO 2009/013961 A1 | | 1/2009 |
| WO | WO-2009/060481 A1 | * | 5/2009 |
| WO | WO 2009/060481 A1 | | 5/2009 |
| WO | WO 2011/012977 A1 | | 2/2011 |
| WO | WO 2011/012980 A1 | | 2/2011 |

OTHER PUBLICATIONS

Machine translation for Japan 11-208218 (no date).*
Machine translation for Japan 07-228107 (no date).*
Translation for Japan 63-116907 (no date).*
Machine translation for Japan 63-121505 (no date).*
International Search Report from the European Patent Office for International Application No. PCT/IB2010/001855, dated Dec. 6, 2010.

* cited by examiner

MOTOR VEHICLE TYRE

CROSS REFERENCE TO RELATED APPLICATIONS

This application is a national phase application based on PCT/IB2010/001855, filed Jul. 28, 2010, and claims the priority of Italian Patent Application No. RM2009A000398, filed Jul. 28, 2009, and the benefit of U.S. Provisional Application No. 61/272,757, filed Oct. 29, 2009, the content of all of which is incorporated herein by reference.

BACKGROUND OF THE INVENTION

Field of the Invention

The present invention relates to motor vehicle tyres. In particular, the present invention relates to tyres intended to be mounted on the rear wheel of "supersport" motor vehicles having large engine capacity (e.g. 600 cm$^3$ or higher), and/or high power (e.g. 170-180 hp or higher), also used on tracks.

Description of the Related Art

In recent times a trend has been observed to introduce in the market motor vehicles for supersport use having increasingly high power. For example, motor vehicles for road use having an engine capacity of 1000 cm$^3$ or higher, with powers of 180 hp, are in fact already available on the market.

For ensuring such high performances, the tyres mounted on the wheels of such motor vehicles shall have very good features as regards the grip to the ground, so as to be able to effectively transfer the high traction torque to the ground, both while running on a straight path and while accelerating on leaving a bend, as well as to ensure an effective braking action. The grip becomes a really critical issue above all when running on wet road surfaces.

For ensuring to the motorcyclist that such performances are reached in a fully safe condition, the tyres shall ensure, together with a very good grip to the ground, behaviour stability both while running on a straight path and while running on bends, particularly in conditions of high acceleration/deceleration. In fact, a stable behaviour of the tyre indicates its capacity to effectively dampen perturbations transmitted by the unevenness of the road surface while running, so that such perturbations are not propagated to the motor vehicle, thus compromising the driving stability.

EP906836 describes a tyre for a two-wheeled vehicle comprising a tread band having at least one groove extending axially from the tread centre to the tread edges. In a first axial region of the tread band, which is the central region of the tread band and is intended to contact the ground when moving in a straight line, the groove is arranged substantially circumferentially. In a second axial region at the axial edge of tread band, which is the region intended to contact the ground when the vehicle is cornering at the maximum camber angle, the alignment of the grooves is substantially transverse. In a third axial region, which is the region of the tread band between the first central region and the second region, and which is the region intended to contact the ground when the vehicle is cornering at a camber angle less than the maximum one, the alignment changes progressively axially outwardly from substantially circumferential to substantially transverse so that in the first, second and third axial regions of the tread band the grooves are substantially aligned with the resultant forces acting on the tread band surface in the contact region between the tread band and the ground.

SUMMARY OF THE INVENTION

The Applicant has nevertheless observed that in the tyres for two-wheeled vehicles such as those described in the documents above, the void-to-rubber ratio may be too high and thus unsuitable for tyres for the sport segment.

The Applicant has therefore faced the problem of providing tyres for motor vehicles for the sport segment capable of ensuring, both when used on dry grounds and when used on wet grounds, suitable performances as regards grip and behaviour stability.

The Applicant has found that it is possible to obtain an effective draining action and a good structural stiffness of the tread band avoiding to arrange grooves at the equatorial plane of the tyre and circumferentially distributing the grooves on the tread band in a uniform and substantially regular way.

In a first aspect thereof, the invention relates to a motor vehicle tyre, particularly adapted to be mounted on the rear wheel of a motor vehicle, comprising a tread band having a tread pattern comprising a module which is repeated along a direction of circumferential extension of the tyre, said module comprising:

at least one first pair of first grooves inclined in opposite directions with respect to an equatorial plane X-X of the tyre; each first groove of the pair of first grooves extending between the equatorial plane X-X and a respective shoulder;

at least one second pair of second grooves which are inclined in opposite directions with respect to said equatorial plane X-X; each second groove of said second pair extending between the equatorial plane X-X and a respective shoulder;

wherein the first grooves are staggered between one another in the circumferential direction;

wherein the second grooves are staggered between one another in the circumferential direction;

wherein each first pair of first grooves alternates in the circumferential direction with a respective second pair of second grooves; and wherein the first and second grooves are arranged on said tread band in such a way as to form an annular central portion L straddling the equatorial plane X-X with a void-to-rubber ratio substantially equal to zero.

For the purposes of the present invention, by the expression "module" of a tread pattern it is meant the minimum portion of a tread pattern which comprises one or more groups of grooves and is substantially repeated the same in succession along the whole circumferential development of the tread band itself. The modules, while keeping the same groove arrangement, may however have different circumferential lengths (or "pitches").

Furthermore, for the purposes of the present invention, by "tread pattern" it is meant the representation of each point of the tread band (grooves included) on a plane perpendicular to the equatorial plane of the tyre and tangent to the maximum diameter of the tyre. In the representation:

in the lateral direction the distance of each point of the tread band from the equatorial plane corresponds to the distance of such point from the equatorial plane measured on the lateral development of the band itself;

in the circumferential direction the distance between any two points of the tread band corresponds to the distance between the projections of the two points on the circumference corresponding to the maximum diameter of the tyre, which projection is obtained by means of radial planes passing at the two points.

Angular measurements, and/or linear quantities (distances, widths, lengths, etc.), and/or surfaces are to be intended as referred to the tread patter as defined above.

For the purposes of the present invention, the following definitions are further applied:

by "motor vehicle tyre" it is meant a tyre having a high curvature ratio (typically higher than 0.200), which allows high camber angles (for example) 50°-60°) to be reached when the motor vehicle runs on a bend.

By "equatorial plane" of the tyre it is meant a plane perpendicular to the rotation axis of the tyre and dividing the tyre into two symmetrically equal portions.

By "circumferential" direction it is meant a direction generically directed according to the rotation direction of the tyre, or in any case only slightly inclined with respect to the rotation direction of the tyre.

By "void-to-rubber ratio" it is meant the ratio between the total surface of the notches of a determined portion of the tread pattern of the tyre (possibly of the whole tread pattern) and the total surface of the determined portion of the tread pattern (possibly of the whole tread pattern).

By "lateral development" of the tread band it is meant the length of the arc defining the radially outermost profile of the tread band in a cross section of the tyre.

By "axial extension" of a tread band portion it is meant the extension of such portion on the lateral development of the tread band.

By "curvature ratio" of the tyre it is meant the ratio between the distance of the radially highest point of the tread band from the maximum chord of the tyre, and the same maximum chord of the tyre, in a cross section of the tyre.

By "circumferential extension" of a groove it is meant the extension of the projection in the circumferential direction of the groove itself.

If not differently stated, by "extension" of a groove it is meant the length of the groove measured along its extension.

By "average inclination" of a groove it is meant the arithmetical mean of the inclinations of the segments forming the groove.

By "pitch" of the tyre it is meant the length in the circumferential direction of a module.

The present invention, in one or more preferred aspects, may comprise one or more of the features hereinafter presented.

Preferably, the module is repeated along a circumferential direction of the tyre at most thirteen times. Even more preferably, the module is repeated at most ten times.

In the Applicant's view, such a low repetition of the module contributes to spreading the grooves in the circumferential direction and counteracts the mobility of the compound of the tread band, thus providing a stabilizing effect with respect to perturbations arising while running on a road surface.

Conveniently, the first and/or second grooves may be staggered relative to each other in the circumferential direction in such a way as to maintain a distance less than about one half of the pitch measured in the circumferential direction.

Preferably, the first and/or second grooves may be staggered relative to each other in the circumferential direction in such a way as to maintain a distance of about one quarter of the pitch measured in the circumferential direction.

The first and second grooves are thus circumferentially distributed along the tread band in a substantially uniform way, in such a way to alternate with each other on opposite sides with respect to the equatorial plane at a distance (measured in the circumferential direction) which remains substantially constant (apart from usual pitch variations introduced in the tread band). The alternation of the first grooves with each other, of the second grooves with each other, and of the first grooves with the second grooves, refers in particular to the axially innermost ends of such grooves.

In order to evaluate the distance in the circumferential direction between the grooves, it can be measured, for example, the distance in the circumferential direction between the axially innermost ends of the grooves themselves.

For avoiding an excessive reduction in the number of grooves of the tread pattern, with a resulting safety reduction when running on wet grounds, the tread pattern conveniently defines on the tread band a void-to-rubber ratio of more than 4%.

The tread pattern of a tyre intended for a sport and/or "supersport" segment, such as the tyre of the present invention, may conveniently define a void-to-rubber ratio at most equal to 10%, so as to counteract an excessive mobility of the compound of the tread band.

The first grooves may have an axially inner end separated by a predetermined distance $D_1$ from the equatorial plane X-X.

The second grooves may have an axially inner end separated by a predetermined distance $D_2$ from the equatorial plane X-X.

Preferably, the distances $D_1$ and $D_2$ are different from each other.

Advantageously, each first groove may comprise, moving axially away from the equatorial plane (X-X) of the tyre, a plurality of segments. In a preferred embodiment, each first groove respectively comprises at least a first, a second and a third substantially straight segment. The first, second and third segments of each first groove may have a different inclination with respect to the equatorial plane of the tyre.

Conveniently, the first segment of each first groove is inclined with respect to the equatorial plane by an angle $\alpha_1$ of less than 45°.

Keeping the extension of the first segment the same, the choice of an almost circumferential inclination for the first segment of each first groove allows the impact frequency of the groove ends on the ground while the tyre is rolling at high speed on a straight path to be reduced, which results in an improvement as regards the behaviour stability of the tyre and in a better wear resistance.

Preferably, the second segment of each first groove is inclined with respect to the equatorial plane X-X by an angle $\alpha_2$ which is greater than $\alpha_1$. Preferably, said third segment is inclined with respect to the equatorial plane by an angle $\alpha_3$ which is less than $\alpha_2$.

Advantageously, each second groove may comprise, proceeding axially away from the equatorial plane X-X of the tyre, a plurality of segments. In a preferred embodiment, each second groove respectively comprises a first and a second essentially straight segment. The first segment may be shorter than the second segment. The first and second segment of each second groove may have a different inclination with respect to the equatorial plane of the tyre.

Preferably, the first segment of each second groove is less than 50% of the length of the second segment.

Conveniently, the first segment of each second groove may be inclined with respect to the equatorial plane X-X by an angle $\alpha_4$ of less than 45°.

Also in this case, keeping the extension of the first segment the same, the choice of an almost circumferential inclination for the first segment of each second groove allows the impact frequency of the groove ends on the ground while the tyre is rolling at high speed on a straight path to be reduced, which results in an improvement as regards the behaviour stability of the tyre and in a better wear resistance.

Preferably, the second segment of each second groove is inclined with respect to the equatorial plane X-X by an angle $\alpha_5$ which is greater than $\alpha_4$.

Advantageously, the width of the first and second grooves varies along their length.

Conveniently, the first segment of each first groove has an inclination $\alpha_1$ with respect to the equatorial plane X-X of the tyre which is different from the inclination $\alpha_4$ with respect to the equatorial plane X-X of the first segment of each second groove.

Preferably, the segments of each first groove have a difference of inclination from each other at most equal to about 25°.

Similarly, the segments of each second groove have a difference of inclination from each other at most equal to about 25°.

Conveniently, at least one axially outer portion of the tread band has a void-to-rubber ratio substantially equal to zero.

The Applicant has observed that, particularly when applied to a rear tyre, such choice allows a considerable improvement in the contact surface when running on a bend on dry grounds at the maximum camber angle (or in any case at very high camber angles), which results in higher road-holding, stability and acceleration power when the motor vehicle is leaving the bend. Furthermore, the Applicant has observed that such a choice does not represent a danger when running on wet grounds, since such running conditions do not allow high camber angles on a bend to be reached.

BRIEF DESCRIPTION OF THE FIGURES

Further features and advantages of the present invention shall become clearer from the following detailed description of some embodiments thereof, made hereafter for indicating and non-limiting purposes with reference to the accompanying drawings, wherein.

DETAILED DESCRIPTION OF EMBODIMENTS OF THE INVENTION

Figure 1:
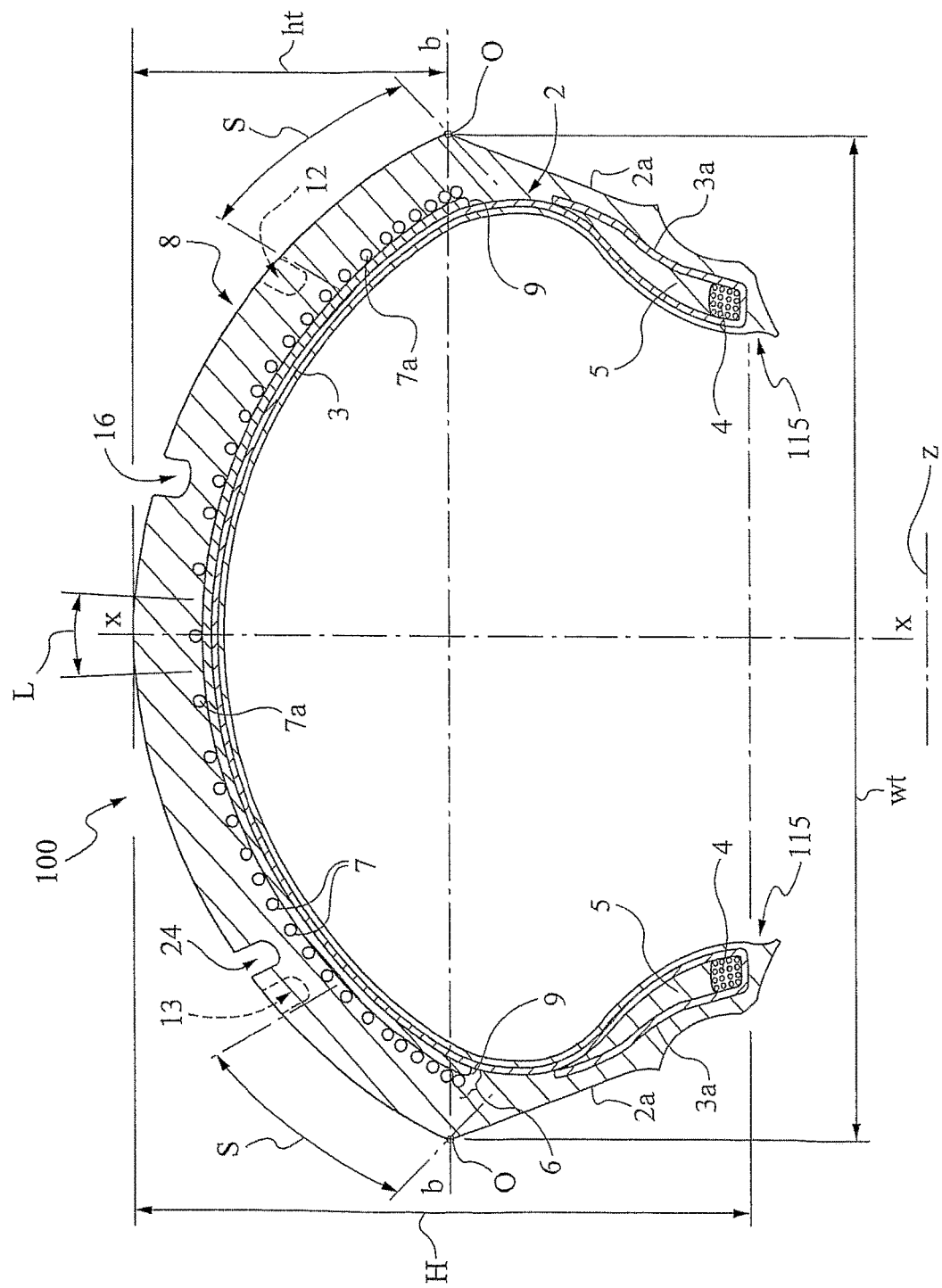
FIG. 1 schematically shows a section perpendicular to the equatorial plane of an example of a motor vehicle tyre according to the invention.
Figure 2:
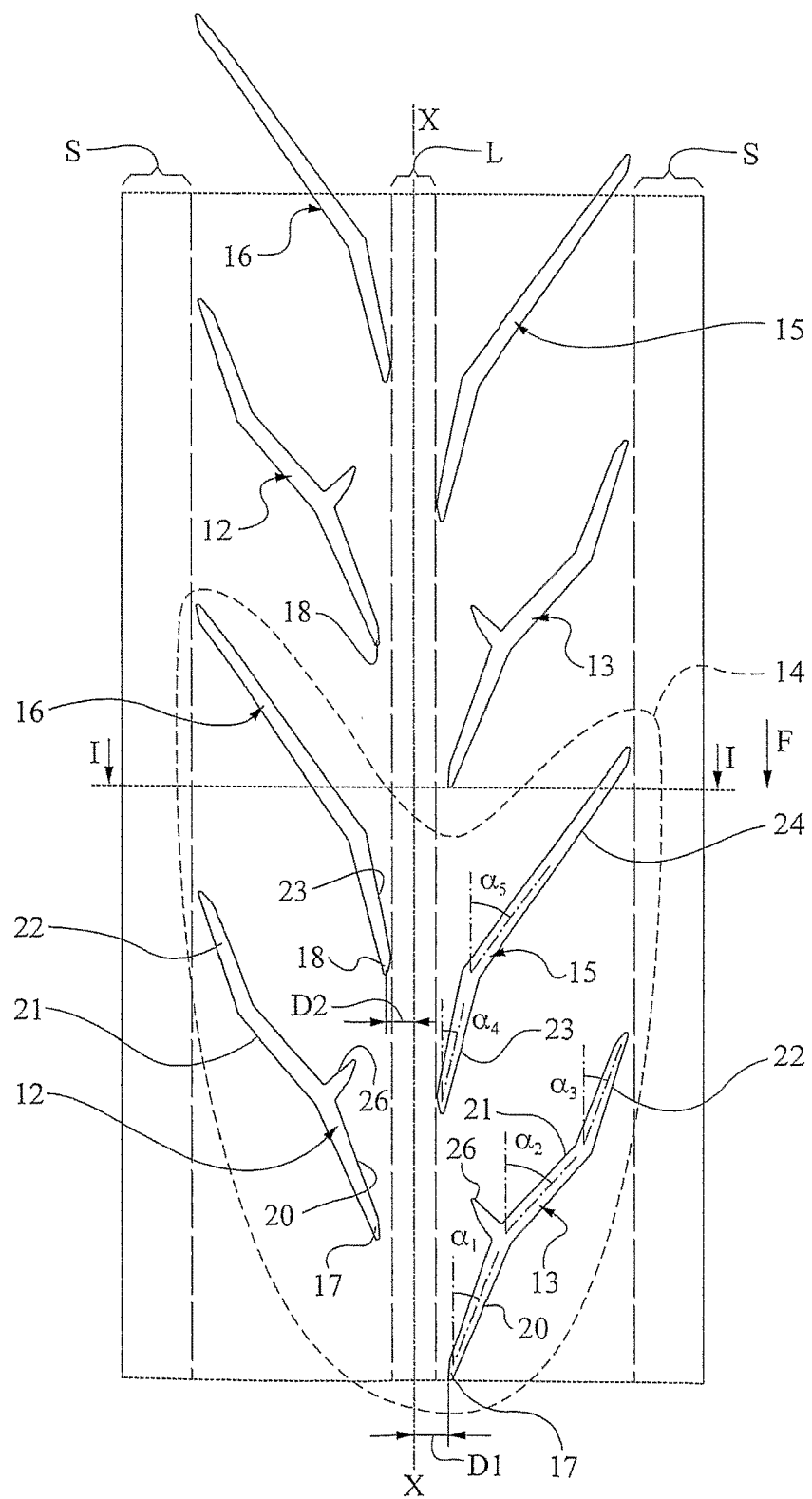
FIG. 2 shows a portion of the circumferential development of a first example of a tread pattern to be applied to a tyre according to the invention, particularly a tyre to be mounted on the rear wheel of a motor vehicle.

In FIG. 1 and FIG. 2, an example of a tyre for motor vehicle wheels is globally indicated at 100. In particular, this is a tyre preferably intended to be used on the rear wheel of a motor vehicle for the sport or supersport segment.

An equatorial plane X-X and a rotation axis Z are defined in the tyre 100. Moreover, there are defined a circumferential direction (indicated in FIG. 2 by means of an arrow F pointing in the rotation direction of the tyre) and an axial direction perpendicular to the equatorial plane X-X.

The tyre 100 comprises a carcass structure 2 including at least one carcass ply 3.

The carcass structure 2 is preferably lined on its inner walls with a sealing layer 16, also called "liner", essentially consisting of a layer of an airproof elastomeric material, adapted to ensure the tight seal of the tyre itself after it has been inflated.

The carcass plies 3 are engaged, at the respective axially opposite lateral edges 3a, with respective annular reinforcing structures 4 intended to hold the tyre on a corresponding fitting rim. The annular reinforcing structures 4 are typically called "bead rings".

A tapered elastomeric filling 5 taking up the space defined between the carcass plies 3 and the respective turned up lateral edge 3a of the carcass plies 3 is applied onto the radially outer perimeter edge of the bead rings 4.

In an alternative embodiment, not shown, the carcass ply has its opposite lateral edges associated without a turn-up with special annular reinforcing structures provided with two metal annular inserts. In this case, a filling of elastomeric material can be arranged in an axially outer position with respect to the first annular insert. The second annular insert is instead arranged in an axially outer position with respect to the end of the carcass ply. Finally, in an axially outer position with respect to said second annular insert, and not necessarily in contact with the same, a further filling can be provided which finishes the formation of the annular reinforcing structure.

The region of the tyre comprising the bead ring 4 and the filling 5 defines the so-called "bead", globally indicated at 115 in FIG. 1, which is intended for anchoring the tyre to a corresponding fitting rim, not shown.

A belt structure 6 is provided in a radially outer position with respect to the aforementioned carcass structure.

A tread band 8, at which the tyre 1 contacts the ground, is provided in a radially outer position with respect to the belt structure.

The tyre may further comprise a pair of sidewalls 2a laterally applied to the carcass structure 2 on axially opposite sides of the equatorial plane X-X. The sidewalls extend from the tread band 8 to the bead 115 of the tyre.

The tyre 100 of the present invention is characterised by a high transverse curvature and lowered sidewalls.

The transverse curvature of a tyre is defined by the particular value of the ratio between the distance ht (FIG. 1) of the top of the tread band from the line b-b passing through the ends O of the tread, measured on the equatorial plane X-X, and the distance wt between said ends of the tread band. Should the ends of the tread band not be easily identifiable, for example due to the lack of a precise reference, such as for example the edge indicated at O in FIG. 1, as the distance wt can certainly be taken the length of the maximum chord of the tyre.

The value of the aforementioned transversal curvature is called "curvature ratio" of the tyre.

The tyre 100 of the present invention preferably has a curvature ratio greater than or equal to 0.25. Such a curvature ratio is typically less than or equal to 0.7, preferably less than or equal to 0.5.

As regards the sidewalls, on the other hand, the tyre of the present invention is preferably a tyre with particularly low sidewalls (FIG. 1). By tyres with low or lowered sidewalls in the present description are meant tyres wherein the ratio between the distance (H-ht) and the height H, measured on the equatorial plane X-X between the top of the tread band and the fitting diameter, defined by the reference line 1 passing through the beads of the tyre, is less than 0.7, more preferably less than 0.5, for example equal to 0.45.

Each carcass ply 3 is preferably made from an elastomeric material and comprises a plurality of reinforcing elements (not shown) arranged parallel to one another.

The reinforcing elements included in the carcass plies 3 preferably comprise textile cords selected from those usually adopted in the manufacture of carcasses for tyres, for example nylon, rayon, aramid, PET, PEN, with an elementary thread having a diameter between 0.35 mm and 1.5 mm. The reinforcing elements in the carcass ply 3 are preferably arranged in a radial direction, i.e. according to an angle between 70° and 110°, more preferably between 80° and 100°, with respect to the equatorial plane X-X.

The belt structure 6 preferably comprises one or more rubberized cords 7, arranged parallel to one another and in side-by-side relationship in the axial direction on the crown portion 16 of the carcass structure 2, so as to form a plurality of coils 7a. Such coils are substantially oriented according to the circumferential direction of the tyre (typically with an angle between 0° and 5° with respect to the equatorial plane X-X of the tyre), such a direction usually being known as "at zero degrees" with reference to how it lies with respect to the equatorial plane X-X of the tyre. The aforementioned coils preferably extend over the entire crown portion of the carcass structure 2.

Preferably, the belt structure 6 consists of a single cord 7, or of a rubberized fabric strip comprising cords arranged in side-by-side relationship, preferably up to five, spirally wound from one end to the other on the crown portion 16 of the carcass structure 2.

Alternatively, the belt structure 6 may comprise at least two radially superimposed layers, each consisting of elastomeric material reinforced with cords arranged parallel to one another. The layers are arranged so that the cords of the first belt layer are oriented obliquely with respect to the equatorial plane of the tyre, whereas the cords of the second layer also have an oblique orientation, but symmetrically crossed with respect to the cords of the first layer, to form the so-called "cross-belt".

The cords 7 of the belt structure 6 are textile or metal cords.

Preferably, for the use in a belt at zero degrees, such cords are made through steel wires with high carbon content, i.e. steel wires with a carbon content at least equal to 0.7%. Preferably, such cords 7 are metal cords made from steel of the high elongation (HE) type. The high elongation (HE) cords have a load-elongation diagram comprising a curvilinear portion arranged between two substantially straight portions having different inclinations with respect to the axes of the diagram.

When textile cords are used, these can be made from a synthetic fiber, for example nylon, rayon, PEN, PET, preferably a synthetic fiber with high modulus, in particular synthetic aramid fiber (for example Kevlar® fibers). Alternatively, hybrid cords can be used comprising at least one thread with low modulus, i.e. with a modulus not greater than 15000 N/mm2 (for example nylon or rayon), interwoven with at least one thread with high modulus (for example Kevlar®), i.e. with a modulus not smaller than 25000 N/mm$^2$.

The belt structure 6 may also comprise a first support layer 9 substantially consisting of a sheet of elastomeric material interposed between the layer of cords 7 and the carcass ply 3 and on which the coils 7a are wound. Such layer may extend on a surface having an axial extension substantially corresponding to the surface on which the coils 7a extend.

In a preferred embodiment of the tyre 100 of the present invention, the layer 9 comprises short aramid fibres, for example made from Kevlar®, dispersed in the elastomeric material.

On the tread band 8, as shown in FIG. 2, a tread pattern is formed which comprises a plurality of grooves defining on the tread band an overall void-to-rubber ratio greater than 4%. In the example shown in FIG. 2, the void-to-rubber ratio is equal to about 9.5%.

According to an advantageous aspect of the present invention the tread pattern comprises a module 14 repeatedly reproduced along a direction of circumferential development of the tyre. Preferably the module 14 is repeated along the circumferential direction of the tyre at most thirteen times, more preferably at most ten times.

The module 14 has at least one first pair of first grooves 12, 13 inclined in opposite directions with respect to the equatorial plane X-X of the tyre. The first grooves 12, 13 respectively extend on opposite sides of the equatorial plane X-X. The module 14 also comprises at least one second pair of second grooves 15, 16, which are as well inclined in opposite directions with respect to the equatorial plane X-X. The second grooves 15, 16 respectively extend on opposite sides of the equatorial plane X-X.

Each first groove 12, 13, as well as each second groove 15, 16, extends between the equatorial plane X-X and a shoulder.

The first grooves 12, 13 of the first pair are staggered relative to each other in the circumferential direction. The circumferentially staggered arrangement of the first grooves 12, 13 is in particular a circumferentially staggered arrangement of the axially inner ends of the first grooves 12, 13 themselves.

Similarly, also the second grooves 15, 16 of the second pair are staggered relative to each other in the circumferential direction. The circumferentially staggered arrangement of the second grooves 15, 16 is in particular a circumferentially staggered arrangement of the axially inner ends of the second grooves 15, 16 themselves.

Preferably, each pair of first grooves alternates in the circumferential direction with a pair of second grooves 15, 16.

Preferably, the first 12, 13 and second 15, 16 grooves are staggered in the circumferential direction in such a way as to maintain a substantially constant distance from each other of less than one half of the pitch. The axially inner ends of the first grooves 12, 13 and/or of the second grooves 15, 16 can be taken as a reference for measuring such a distance.

Such a choice allows the grooves to be distributed in a homogeneous and substantially uniform way in the circumferential direction of the tread band.

Even more preferably, the first 12, 13 and the second 15, 16 grooves are staggered in the circumferential direction in such a way as to maintain a substantially constant distance from each other of about one quarter of the pitch.

The first grooves 12, 13, as the second grooves 15, 16 extend from the equatorial plane X-X towards the shoulders and have an average inclination of less than 60°.

In the preferred embodiment shown in FIG. 2 the first grooves 12, 13 do not extend starting exactly from the equatorial plane X-X, but are separated from the same and do not cross it. In detail, the first grooves 12, 13 have an axially inner end 17 separated by a predetermined distance $D_1$ from the equatorial plane X-X.

Similarly, the second grooves 15, 16 do not extend starting exactly from the equatorial plane X-X, but are separated from the same and do not cross it. In detail, the second grooves 15, 16 have an axially inner end 18 separated by a predetermined distance D2 from the equatorial plane X-X.

In this way, in the preferred embodiment shown in FIG. 2, the first 12, 13 and second 15, 16 grooves define an annular central portion L straddling the equatorial plane substantially without grooves or notches.

In other words, the first 12, 13 and second 15, 16 grooves form an annular central portion L straddling the equatorial plane X-X with a void-to-rubber ratio substantially equal to zero. The annular central portion L has an axial extension equal at least to 5% of the lateral development of the tread band 8, and at most to 10%, for example to 8% of the lateral development of the tread band 8.

The Applicant has observed that such a choice can be particularly advantageous for the rear tyre, since it allows to considerably increase the area of the contact region between tyre and ground when running on a straight path at high speed, so as to effectively transfer to the ground the traction torque while accelerating and/or the braking torque while decelerating. Moreover, the formation of a closed tread band ring in the central sub-portion L advantageously increases the stiffness thereof.

Still in the embodiment shown in FIG. 2, the predetermined distance D1 between the equatorial plane X-X and the axially inner end 17 of a first groove 12, 13 is different from the predetermined distance D2 between the equatorial plane X-X and the axially inner end 18 of a second groove 15, 16. Advantageously, the predetermined distance D1 is greater than D2. For example, D2 can be 30% less than D1.

In this way the axially inner ends of the first and second grooves are not circumferentially aligned with each other. In the Applicant's view, this choice allows an increase in the draining effectiveness and a reduction in the probability of causing instabilities when running on wet grounds because of the alignment of the water draining points.

Preferably, the first grooves 12, 13 have an average inclination with respect to the equatorial plane X-X of less than 60°, more preferably less than 50°, even more preferably an average inclination of less than 45°.

In detail, the first grooves 12, 13 may have, moving axially away from the equatorial plane X-X, at least three substantially straight segments 20, 21, 22. The three substantially straight segments 20, 21, 22 may have substantially the same length measured along their extension.

The first, axially innermost, segment 20, may be inclined with respect to the equatorial plane X-X by an angle $\alpha_1$ of more than 0°, less than 45°, preferably less than 30°, for example equal to about 20°.

Keeping the extension of the first segment 20 the same, the choice of an inclination angle with respect to the equatorial plane which is not high allows the impact frequency of the groove ends on the ground when the tyre is rolling at high speed on a straight path to be reduced, with a resulting improvement as regards the behaviour stability of the tyre and a better wear resistance.

The second substantially straight segment 21 is arranged consecutively to the first straight segment 20 and may be inclined with respect to the equatorial plane X-X by an angle $\alpha_2$ greater than $\alpha_1$.

In detail, $\alpha_2$ is less than 60°, preferably less than 50°, for example equal to about 45°.

The third substantially straight segment 22 is arranged consecutively to the second straight segment 21 and may be inclined with respect to the equatorial plane X-X by an angle $\alpha_3$ less than $\alpha_2$.

Advantageously, considered in pairs, the subsequent straight segments of the first grooves 12, 13 moving axially away from the equatorial plane X-X have a difference of inclination from each other at most equal to 25°.

In other words, $\alpha_2$ differs from $\alpha_1$, at most by 25°, as well as $\alpha_3$ differs from $\alpha_2$, at most by 25°.

Such a choice allows the creation of main grooves, i.e. grooves characterised by a significant extension, which have critical points affected by wear phenomena where the inclination changes, to be avoided. A significant extension of the grooves may correspond, for example, to at least 3-4% of the circumferential development of the tread band.

As shown in FIG. 2, the first grooves 12, 13 may have a substantially straight fourth segment 26 which is shorter than the remaining segments 20, 21, 22 and has an inclination with respect to equatorial plane X-X opposite to that of the segments 20, 21, 22.

The fourth segment 26 extends from a first groove 12, 13 at the intersection area between the first 20 and second 21 substantially straight segments.

The first grooves 12, 13 do not extend on the whole lateral development of the tread band 8, rather they extend on a width of the tread band equal to 60-70% of the lateral development of the tread band 8.

The first grooves 12, 13 may have a depth which decreases diminishing from the equatorial plane X-X towards the shoulders. Preferably, the first grooves 12, 13 have a depth less than or equal to 6 mm.

According to the embodiment shown in FIG. 2, the first grooves 12, 13 do not have a constant width along their extension. Preferably, the grooves 12, 13 have a width less than or equal to 6 mm.

As mentioned above, each pair of first grooves alternates in the circumferential direction with a pair of second grooves 15, 16.

In the preferred embodiment, shown in FIG. 2, each first groove 12, 13 is followed in the circumferential direction by a first 12, 13 or a second 15, 16 groove having an inclination with respect to the equatorial plane X-X opposite to that of the preceding groove. Similarly, each second groove 15, 16 is followed in the circumferential direction by a second 15, 16 or a first 12, 13 groove having an inclination with respect to the equatorial plane X-X opposite to that of the preceding groove.

Also the second grooves 15, 16 do not extend on the whole lateral development of the tread band 8, rather they extend on a width of the tread band 8 equal to 60-70% of the lateral development of the tread band 8.

Preferably, also the second grooves 15, 16 have an average inclination with respect to the equatorial plane X-X of less than 60°, preferably less than 40°, for example an average inclination of 35°.

In detail, the second grooves 15, 16 may have, moving axially away from the equatorial plane X-X, at least two substantially straight segments 23, 24.

The first, axially innermost, segment 23, may be inclined with respect to the equatorial plane X-X by an angle $\alpha_4$ of more than 0°, less than 30°, preferably less than 20°, for example equal to about 10°.

Also in this case, keeping the extension of the first segment 23 of the second grooves the same, the choice of an inclination angle with respect to the equatorial plane which is not high allows the impact frequency of the groove ends on the ground when the tyre is rolling at high speed on a straight path to be reduced, with resulting improvement as regards the behaviour stability of the tyre and a better wear resistance.

Preferably, the second substantially straight segment 24 is arranged consecutively to the first straight segment and may be inclined with respect to the equatorial plane X-X by an angle $\alpha_5$ which is greater than $\alpha_4$.

In detail, $\alpha_5$ is less than 60°, preferably less 45°, for example equal to about 35°.

Advantageously, $\alpha_5$ differs from $\alpha_4$ at most by about 25°.

Such a choice allows the creation of main grooves, i.e. grooves characterised by a significant extension, which have critical points affected by wear phenomena where the inclination changes, to be avoided.

The first segment 20 of a first groove 12, 13 has a higher inclination compared to the first segment 23 of the second groove 15, 16 arranged subsequently in the circumferential direction and in the same axial portion of the tread band 8 with respect to the equatorial plane X-X.

In the Applicant's view, such a choice, in combination with a phase difference of less than one half between first 12, 13 and second 15, 16 grooves, on the one hand provides the first 12, 13 and the second 15, 16 grooves of the tread band with a good draining, on the other hand limits the risk of formation of structural weakening regions at the central portion of the tread band 8.

In detail, the first segment 20 of the first grooves 12, 13 has an inclination $\alpha_1$ with respect to the equatorial plane X-X greater than the inclination $\alpha_4$ of the first segment 23 of the second grooves 15, 16.

Preferably, the difference between $\alpha_4$ and $\alpha_1$ may be kept below about 15°.

In the embodiment shown in FIG. 2, the axially outer end portion of a first groove 12, 13 has an inclination smaller than the inclination of the axially outer end portion of the second groove 15, 16 arranged subsequently in the circumferential direction and in the same axial portion of the tread band 8 with respect to the equatorial plane X-X.

In the Applicant's view, such a choice, in combination with a phase difference of less than one half of the pitch between the first 12, 13 and the second grooves 15, 16 allows keeping substantially constant the distances in the circumferential direction between first 12, 13 and second grooves 15, 16 substantially at the shoulder of the tyre 100, with a resulting increase in the driving evenness in the circumferential direction when running on a bend, above all on wet grounds.

In fact, the substantially constant distance in the circumferential direction at the shoulder of the tyre 100 between the first and second grooves allows avoiding the transmission of a sensation of instability to the driver of the motor vehicle when he is leaning while running on a bend.

The two substantially straight segments 23, 24 of a second groove 15, 16 may have a different length measured along their extension.

In detail in the preferred embodiment shown in FIG. 2, the first segment 23 is shorter than the second segment 24.

Preferably, the first segment 23 is less than 50% of the length of the second segment 24.

The second grooves 15, 16 may have a depth which decreases diminishing from the equatorial plane X-X towards the shoulders. Preferably, the second grooves 15, 16 have a depth less than or equal to 6 mm.

According to the embodiment shown in FIG. 2, the second grooves 15, 16 do not have a constant width along their extension. Preferably, the grooves 15, 16 have a width less than or equal to 6 mm.

A tread pattern such that of the example shown in FIG. 2 defines on the tread band 8 an overall void-to-rubber ratio less than 10%, preferably equal to about 7%. As can be noted, in axially outermost portions, having a width indicated by "s", of the tread band (close to point "E" of FIG. 1) the pattern has no grooves, i.e. it defines a void-to-rubber ratio equal to zero.

This choice may be particularly advantageous for the rear tyre, since it allows both a considerable increase in the area of the contact region between tyre and ground when running on a bend at the maximum camber angle on dry grounds, and the formation of a closed ring in the tread band which increases the stiffness of the same, above all with respect to shear stresses (i.e. in the plane of the lateral and longitudinal contact forces).

The increase in the area of the contact region with the ground and the increase in the stiffness with respect to shear stresses can significantly improve the roadholding of the rear wheel of the motor vehicle when running on a bend and/or the effective transfer of the traction torque to the ground when accelerating on leaving a bend. The width "s", measured on the lateral development of the tread band, of the axially outermost portions having a zero void-to-rubber ratio may range from zero to a maximum of about 35 mm. Preferably, a width of at least 5 mm is left free from grooves in the tread band of tyre adapted to be mounted on the rear wheel of a motor vehicle, particularly for the Supersport segment.

In the following, in table 1, the drive results obtained comparing two tyre sets mounted on the wheels of a motor vehicle (Suzuki GSX 1000) are reported.

In particular, the second set has a rear tyre according to the invention, with a size 190/50 ZR17, while the first set has a comparison rear tyre manufactured by the same Applicant, which have the same size but a higher void-to-rubber ratio. In particular, the void-to-rubber ratio of the rear tyre of the first set (comparison) is equal to about 9%, while the void-to-rubber ratio of the rear tyre of the second set (invention) is equal to about 7.5%.

The tyres of the two sets differs in the pattern of the tread band and in the void-to-rubber ratio, but have the same carcass and belt structure.

In table 1 the assessments obtained from the tyre according to the invention as compared with the comparison tyre are reported for four parameters: manoeuvrability on wet grounds, draining, behaviour predictability and controllability.

TABLE 1

| | Camber angle | 1st Set (comparison) | 2nd Set (invention) |
|---|---|---|---|
| Manoeuvrability on wet grounds | | 3.75 | 3.75 |
| Rear tyre draining | 0° | 4.00 | 4.00 |
| | 0° > 10° | 4.00 | 4.00 |
| | 10° > 20° | 4.00 | 4.00 |
| Behaviour predictability | | 3.50 | 4.00 |
| Controllability | | 3.50 | 4.00 |

The tyre according to the invention has an overall behaviour comparable with that of the comparison tyre as regards manoeuvrability on wet grounds and draining, and a better behaviour as regards behaviour predictability and controllability.

The behaviour predictability and the controllability are very important features for the safety and stability of the motor vehicle, above all in tyres intended for a sport segment, which are therefore characterized by high performances and speeds.

The tyre has therefore a behaviour comparable to, or even better than, that of a tyre of the Applicant already highly appreciated by motorcyclists due to its very good features of handling, grip, manoeuvrability and stability also at high speeds.

In particular, the rear tyre according to the present invention ensures suitable performances as regards grip and behaviour stability both when used on dry grounds and when used on wet grounds.

The present invention has been described with reference to some embodiments thereof. Many modifications can be made in the embodiments described in detail, still remaining within the scope of protection of the invention, defined by the following claims.

The invention claimed is:

1. A motor vehicle tyre capable of being mounted on the rear wheel of a motor vehicle, comprising a tread band having a tread pattern comprising a module which is repeated along a direction of circumferential extension of the tyre, said module comprising:
   at least one first pair of first grooves inclined in opposite directions with respect to an equatorial plane of the tyre; each first groove of the first pair extending between the equatorial plane and a respective shoulder; and
   at least one second pair of second grooves which are inclined in opposite directions with respect to said equatorial plane; each second groove of said second pair extending between the equatorial plane and a respective shoulder, wherein:
   the first grooves of each first pair are staggered in the circumferential direction; and
   the second grooves of each second pair are staggered in the circumferential direction, each first pair of first grooves alternating in the circumferential direction with a respective second pair of second grooves, and wherein:
   the first and second grooves are arranged on said tread band in such a way as to form an annular central portion straddling the equatorial plane with a void-to-rubber ratio substantially equal to zero,
   the at least one first pair of first grooves and the at least one second pair of second grooves are staggered relative to each other in the circumferential direction in such a way as to maintain a substantially constant distance between respective first and second grooves of less than half a pitch measured in the circumferential direction,
   each first groove comprises, moving axially away from the equatorial plane of the tyre, respectively at least a first, a second, and a third substantially straight segment having a difference of inclination from each other at most equal to 25°, and
   each second groove comprises, moving axially away from the equatorial plane of the tyre, respectively at least a first and a second substantially straight segment having a difference of inclination from each other at most equal to 25°;
   wherein the first segment of each first groove has a higher inclination with respect to the equatorial plane than the first segment of each respective circumferentially-adjacent second groove,
   and wherein the first segment of each first groove is inclined with respect to the equatorial plane by an angle $\alpha_1$ of less than 45°, the second segment of each first groove is inclined with respect to the equatorial plane by an angle $\alpha_2$ which is greater than $\alpha_1$, and the third segment of each first groove is inclined with respect to the equatorial plane by an angle $\alpha_3$ which is less than $\alpha_2$.

2. The motor vehicle tyre according to claim 1, wherein the first and/or second grooves are staggered relative to each other in the circumferential direction in such a way as to maintain a substantially constant distance of about one quarter of the pitch measured in the circumferential direction.

3. The motor vehicle tyre according to claim 1, wherein the first and second grooves of the tread pattern define on said tread band an overall void-to-rubber ratio more than 4%.

4. The motor vehicle tyre according to claim 1, wherein the first and second grooves of the tread pattern define on said tread band an overall void-to-rubber ratio less than 10%.

5. The motor vehicle tyre according to claim 1, wherein the first grooves have an axially inner end separated by a predetermined distance from the equatorial plane.

6. The motor vehicle tyre according to claim 1, wherein the second grooves have an axially inner end separated by a predetermined distance from the equatorial plane.

7. The motor vehicle tyre according to claim 1, wherein the first grooves have an axially inner end separated by a predetermined distance $D_1$ from the equatorial plane, and wherein the second grooves have an axially inner end separated by a predetermined distance $D_2$ from the equatorial plane, and the predetermined distance $D_2$ is different from the predetermined distance $D_1$.

8. The motor vehicle tyre according to claim 1, wherein the first segment of each second groove is shorter than the second segment of each second groove.

9. The motor vehicle tyre according to claim 8, wherein the first segment is less than 50% of the length of the second segment.

10. The motor vehicle tyre according to claim 1, wherein said first segment of each second groove is inclined with respect to the equatorial plane by an angle $\alpha_4$ of less than 45°.

11. The motor vehicle tyre according to claim 10, wherein said second segment of each second groove is inclined with respect to the equatorial plane by an angle $\alpha_5$ which is greater than $\alpha_4$.

12. The motor vehicle tyre according to claim 1, wherein width of said first and second grooves varies along a length thereof.

13. The motor vehicle tyre according to claim 1, wherein at least one axially outer portion of said tread band has a void-to-rubber ratio substantially equal to zero.

* * * * *